US010582150B2

(12) United States Patent
High et al.

(10) Patent No.: US 10,582,150 B2
(45) Date of Patent: Mar. 3, 2020

(54) AUDIO/VISUAL RECORDING APPARATUS, AUDIO/VISUAL RECORDING AND PLAYBACK SYSTEM AND METHODS FOR THE SAME

(71) Applicant: Walmart Apollo, LLC, Bentonville, AR (US)

(72) Inventors: Donald R. High, Noel, MO (US); Brian Gerard McHale, Oldham (GB)

(73) Assignee: WALMART APOLLO, LLC, Bentonville, AR (US)

( * ) Notice: Subject to any disclaimer, the term of this patent is extended or adjusted under 35 U.S.C. 154(b) by 26 days.

(21) Appl. No.: 15/393,313

(22) Filed: Dec. 29, 2016

(65) Prior Publication Data

US 2017/0195619 A1 Jul. 6, 2017

Related U.S. Application Data

(60) Provisional application No. 62/273,685, filed on Dec. 31, 2015.

(51) Int. Cl.
| | | |
|---|---|---|
| *H04N 5/93* | (2006.01) | |
| *H04N 21/45* | (2011.01) | |
| *H04N 21/435* | (2011.01) | |
| *H04N 21/433* | (2011.01) | |
| *H04N 21/4147* | (2011.01) | |
| *H04N 21/414* | (2011.01) | |

(Continued)

(52) U.S. Cl.
CPC ........... *H04N 5/9305* (2013.01); *G11B 27/34* (2013.01); *H04N 21/2743* (2013.01); *H04N 21/4147* (2013.01); *H04N 21/41407* (2013.01); *H04N 21/435* (2013.01); *H04N 21/4334* (2013.01); *H04N 21/4524* (2013.01)

(58) Field of Classification Search
CPC ......... H04N 21/2743; H04N 21/41407; H04N 21/4334; H04N 21/4524; G11B 27/329; G11B 27/34; G06F 17/30241; G06Q 30/0601; G06Q 30/0643; G06Q 30/0639; H04W 4/02
USPC ........ 386/243, 281, 288; 705/27.2; 382/305; 455/456.1
See application file for complete search history.

(56) References Cited

U.S. PATENT DOCUMENTS

| | | | |
|---|---|---|---|
| 7,525,578 B1 | 4/2009 | Barbeau | |
| 9,720,555 B2 * | 8/2017 | Sorden | G06F 3/048 |
| 2002/0178013 A1 | 11/2002 | Hoffman et al. | |

(Continued)

FOREIGN PATENT DOCUMENTS

EP 1469286 A2 10/2004

OTHER PUBLICATIONS

Combined Search and Examination Report in UK Patent Application No. GB1621989.1, dated Feb. 1, 2019; 11 pages.

*Primary Examiner* — Thai Q Tran
*Assistant Examiner* — Syed Y Hasan
(74) *Attorney, Agent, or Firm* — Schmeiser, Olsen & Watts LLP

(57) ABSTRACT

An audio/visual (A/V) recording apparatus comprises an A/V input, a memory configured for recording A/V signals received from the A/V input, a locator configured to determine a location of the A/V recording apparatus when an A/V recording is taking place to provide location information based on localized location inputs and a tagger configured to tag the recording in the memory with the location information.

16 Claims, 5 Drawing Sheets

(51) Int. Cl.
*H04N 21/2743* (2011.01)
*G11B 27/34* (2006.01)

(56) References Cited

U.S. PATENT DOCUMENTS

| | | | |
|---|---|---|---|
| 2006/0239648 A1* | 10/2006 | Varghese | G06F 17/30038 |
| | | | 386/243 |
| 2007/0073937 A1 | 3/2007 | Feinberg et al. | |
| 2007/0285512 A1 | 12/2007 | Kitani et al. | |
| 2008/0074264 A1 | 3/2008 | Sharpe et al. | |
| 2008/0307311 A1 | 12/2008 | Eyal | |
| 2010/0097221 A1 | 4/2010 | Kreiner et al. | |
| 2011/0161005 A1 | 6/2011 | Hajianpour et al. | |
| 2012/0110031 A1 | 5/2012 | Lahcanski et al. | |
| 2013/0036043 A1* | 2/2013 | Faith | G06Q 30/06 |
| | | | 705/39 |
| 2014/0258029 A1* | 9/2014 | Thierry | G06Q 30/0643 |
| | | | 705/26.8 |
| 2017/0055112 A1* | 2/2017 | Westphal | H04W 4/02 |

* cited by examiner

| | | | | | | | | |
|---|---|---|---|---|---|---|---|---|
| STORE | GENERATE 2D OR 3D STORE MAP (200) | | | | | | | |
| EMPLOYEE | | CREATE A/V RECORDING (202) | | | | | | |
| RECORDING APPARATUS | | | RECEIVE MODULATED LED EMISSIONS (204) | TAG A/V RECORDING WITH LOCATION INFORMATION (206) | | | | |
| CONTENT SERVER | | | | | UPLOAD A/V RECORDING (208) | | LOOK FOR A/V CONTENT (214) | DOWNLOAD RELEVANT A/V CONTENT TO CUSTOMER (216) |
| CUSTOMER PLAYBACK APPARATUS | | | | | | RECEIVE MODULATED LED EMISSIONS (210) | TRANSMIT LOCATION INFORMATION TO CONTENT SERVER (212) | | OFFER OR DISPLAY A/V CONTENT (218) |

Fig. 2

AUDIO/VISUAL RECORDING APPARATUS, AUDIO/VISUAL RECORDING AND PLAYBACK SYSTEM AND METHODS FOR THE SAME

RELATED APPLICATIONS

This application claims priority to U.S. Provisional Patent Application No. 62/273,685, filed Dec. 31, 2015 and entitled "AUDIO/VISUAL RECORDING APPARATUS, AUDIO/VISUAL RECORDING AND PLAYBACK SYSTEM AND METHODS FOR THE SAME," the entirety of which is incorporated by reference herein.

FIELD OF THE INVENTION

The present disclosure relates generally to the field of audio/visual recording apparatuses, audio/visual playback systems and methods for the same.

BACKGROUND TO THE INVENTION

As shopping outlets, and in particular large supermarkets, offer a growing plethora of products, it can be difficult for a shopper or consumer to select a particular product when browsing or searching for an item to buy.

As is well-known, a personal recommendation is helpful when making a product selection, possibly from an in-store employee. However, an in-store employee who is familiar with the products in question is not always available.

SUMMARY

Embodiments herein aim to provide an improved experience for the consumer, or more specifically, a store customer.

According to an embodiment, there is provided an audio/visual (A/V) recording apparatus comprising an A/V input; a memory configured for storing data related to A/V signals received from the A/V input; a locator configured to determine a location of the A/V recording apparatus in response to an A/V recording operation to provide location information based on localized location inputs; and a tagger configured to tag the data stored in the memory with the location information.

Optionally, the locator is configured to determine the location based on inputs from at least one of: Li-Fi, short range radio waves, Wi-Fi beacons, RFID tags and modulated visible light.

Optionally, the apparatus further comprises a communicator configured to upload the recorded A/V content with the tagged location information.

According to an embodiment, there is provide an audio/visual (A/V) recording and playback system comprising the A/V recording apparatus referred to above, an emitter for providing location information, a playback apparatus comprising a display configured to display A/V content and another locator configured to determine a location of the A/V playback apparatus based on localized location inputs, a communicator configured to communicate with a content-provider to display A/V content when the another locator determines that the A/V play back apparatus is at a predetermined location.

Optionally, the emitter is at least one of: Li-Fi, short range radio waves, Wi-Fi beacons, RFID tags and modulated visible light.

Optionally, the emitters have a range of up to 10 meters.

Optionally, the emitters have a range of up to 5 meters.

Optionally, the playback apparatus is configured whereby prior to the playback of A/V content, a user is given the option of one or more A/V contents to display.

Optionally, the predetermined location includes the location at which or in the vicinity of where the A/V content was recorded based on the information tagged to the A/V recording.

Optionally, the playback apparatus is configured to display the location of an item for purchase based on the displayed A/V content.

Optionally, the item location is displayed on a 3-dimensional (3-D) map of a store in which the item is located.

According to an embodiment, there is provided a method of recording audio/visual (A/V) content, the method comprising: recording signals related to an A/V input and storing the recorded signals as A/V content; receiving location information from localized location inputs; and tagging the stored A/V content with the location information.

BRIEF DESCRIPTION OF THE DRAWINGS

Embodiments will now be described, by way of example only, with reference to the accompanying drawings; in which:

FIG. 2 is a process diagram, in accordance with an embodiment.

DETAILED DESCRIPTION OF EMBODIMENTS

At least some of the following examples show an audio/visual (A/V) recording and playback system and components, which are suitable for use in a network of retail stores. Many other advantages and improvements will be discussed in more detail below, or will be appreciated by the skilled person from carrying out example embodiments based on the teachings herein. The example embodiments have been described particularly in relation to a retail store such as a supermarket or general store for grocery and household items. However, it will be appreciated that the example embodiments may be applied in many other specific environments.

Figure 1:
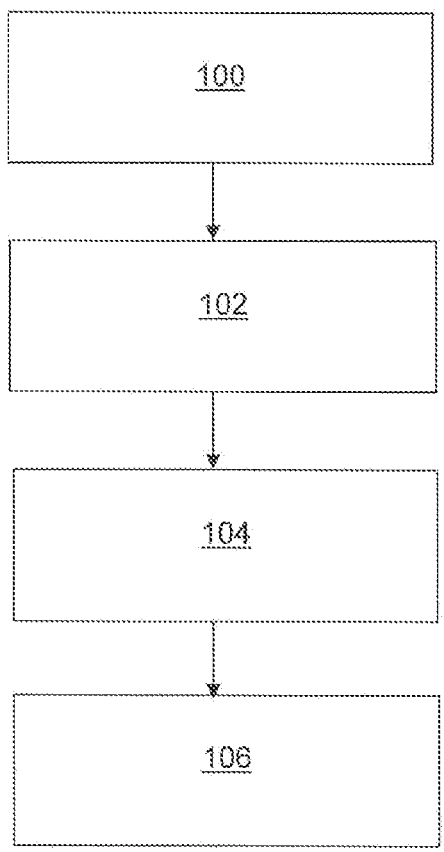
FIG. 1 is a flow diagram illustrating an overview of a method, according to an embodiment.

Referring to FIG. 1 of the accompanying drawings there is shown an overview of an exemplary method in accordance with some embodiments.

According to the method illustrated in FIG. 1, in step 100 an in-store employee, sometimes referred to as a colleague or associate, creates a video comprising A/V content or related multimedia content comprising a combination of audio, motion video, still images, and/or data executed by a processor for display. Thus, when referring to video herein, other forms of presentable media may apply. The video may relate to a product being sold in a store.

In step 102, the content, or video, is tagged with location information based on in-store location information. The video may be tagged by overlaying or otherwise associating the video content with an identifier, which may or may not be displayed with the video.

In step 104 the content is stored on a content server or other storage device along with the tagged location information. For example, the content is stored as data, where it is indexed and organized according to a predetermined format, structure, or related form of data organization. In step 106 when a customer is identified in the vicinity of the location, according to the tagged location information, the A/V content associated with that location is played, or offered to be played to the customer. This can enable a customer to view location-relevant video content provided, for instance, by an in-store employee that the customer may even be familiar with as a regular service provider.

Referring to FIG. 2, there is shown a diagram of a participant model process to provide further details and extensions of the method outlined in relation to FIG. 1. In particular, FIG. 2 is explained in detail below with reference to the physical components shown in FIGS. 3-5 of the accompanying drawings.

Figure 3:
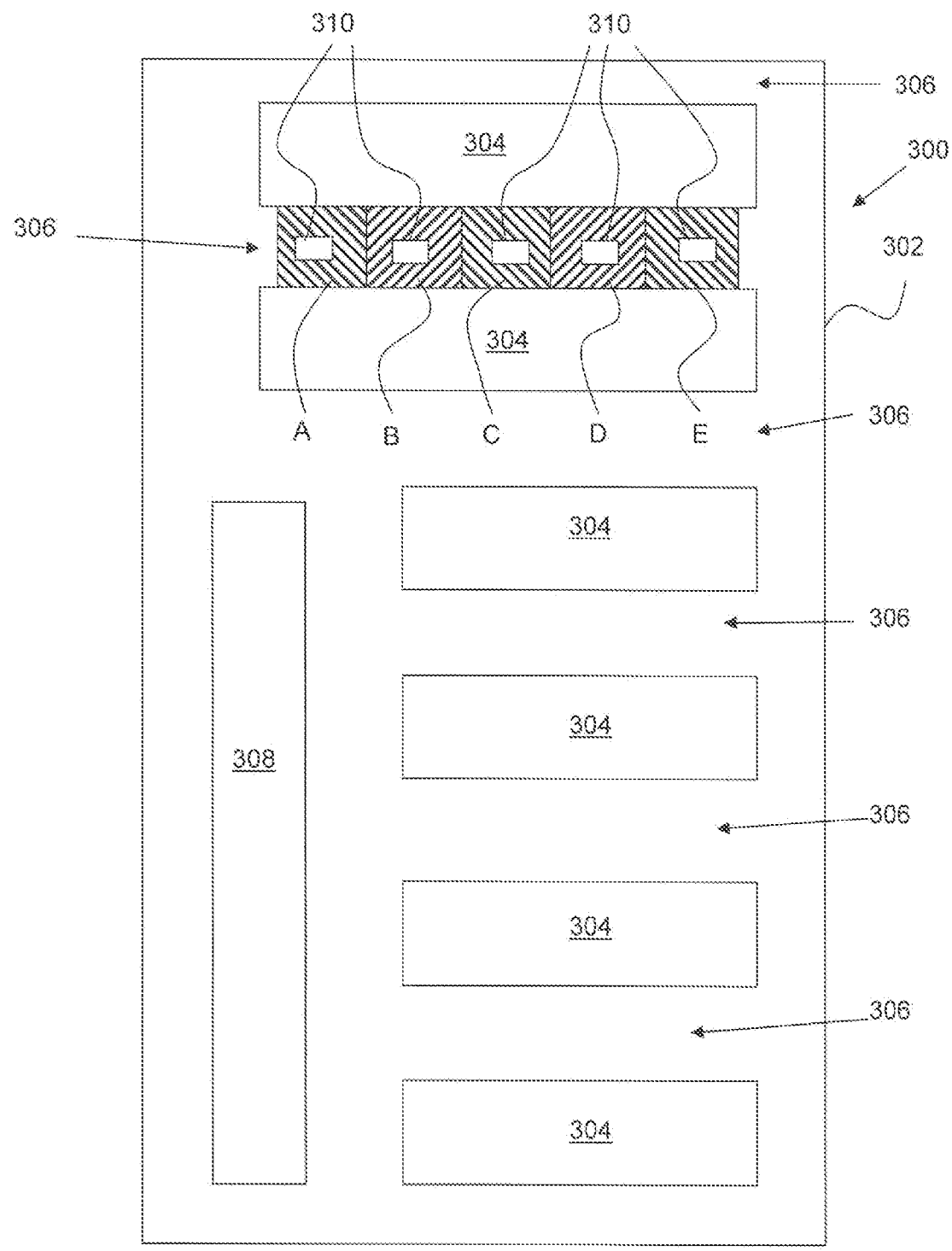
FIG. 3 is a schematic illustration of a store, at which an embodiment may be implemented.

FIG. 3 is a schematic illustration of a store, at which an embodiment may be implemented. The store may be a brick-and-mortar entity where customers may be physically present to purchase products of interest. The store may be a retail outlet, superstore, club, or other retail establishment.

In an embodiment illustrated at FIG. 3, a supermarket store 300 comprises an outer wall 302 inside which are a plurality of shelves or cooling units 304 defining aisles 306 and a plurality of checkouts 308. Mounted in the ceiling (not shown) of the store 300 are a plurality of localized location input emitters comprising modulated LED lights or the like indicated schematically at 310 defining a plurality of zones, indicated by the shaded areas A, B, C, D and E at one or more aisles 306. For simplicity the LED lights 310, and zones A-E, are shown in one aisle 306 only but can readily be in other areas or throughout the entire store. The emitters providing localized location inputs may be relatively short-range emitters that enable a location of a device to be determined in the store 300, or a location relative to the store 300. Examples of such emitters are Li-Fi, short range radio waves, Wi-Fi beacons, i-beacons, RFID tags and modulated visible light such as BYTELIGHT™ technology. Typically these short range emitters have a range of up to 10 meters or sometimes up to 5 meters. By way of example, an exemplary embodiment will be described based on BYTELIGHT™ modulated visible light LED emitters, but it will be understood that other short range location emitters can be used.

Figure 4:
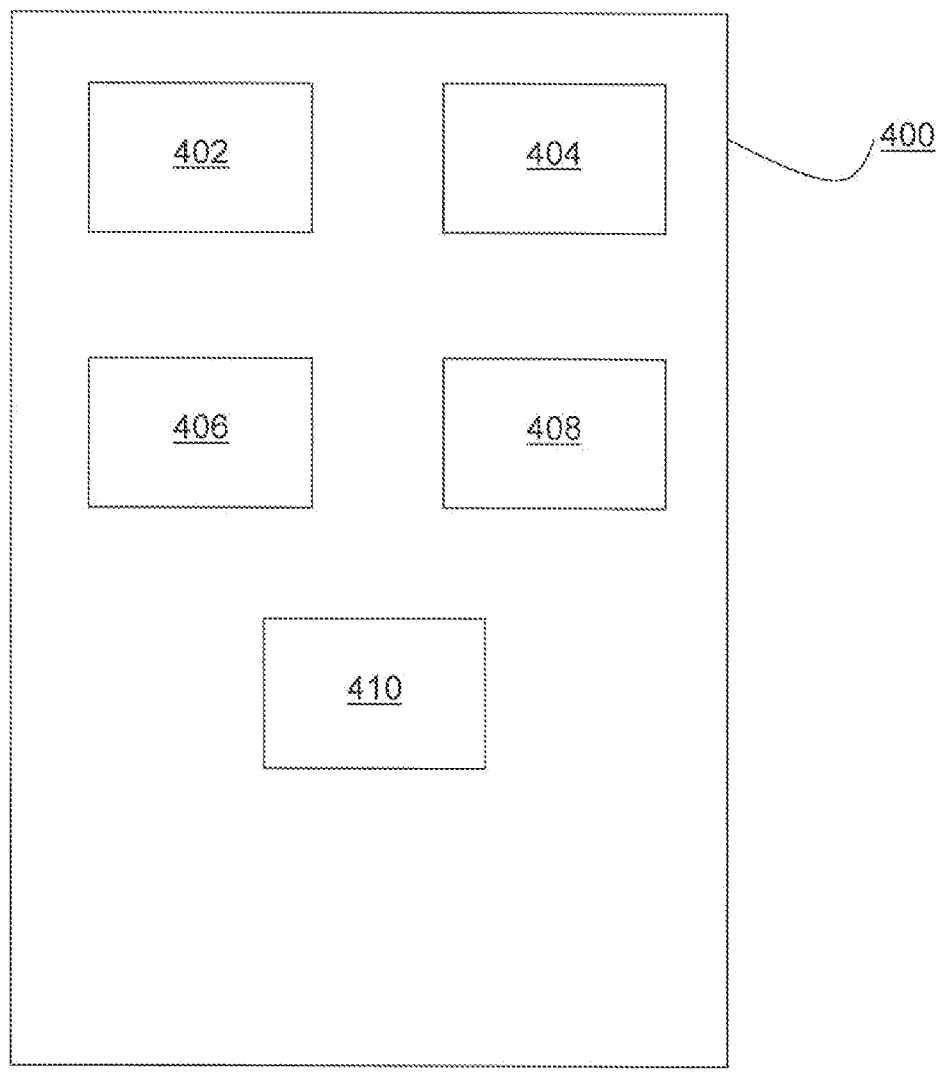
FIG. 4 is a schematic illustration of an audio/visual recording apparatus, according to an embodiment.

Referring to FIG. 4 of the accompanying drawings there is shown an A/V recording apparatus 400 comprising an A/V input 402, a memory 404, a locator 406, a tagger 408 and a communicator 410, but not limited thereto.

The A/V input 402 may include a camera and a microphone, or other electronic sensor device.

The memory 404 is configured for electronically storing A/V signals received from the A/V input 402, for example, data, metadata, or the like that is related to the A/V signals.

The locator 406 is configured to determine the location of the playback apparatus 400 when an A/V recording is taking place to provide location information based on localized location inputs.

The tagger 408 associates the location information with the A/V recording, for example, by embedding the location information in the metadata of the A/V recording.

The communicator 410 may include a radio transceiver or the like configured to operate with the mobile phone cellular network, a Wi-Fi transceiver, or a Bluetooth transceiver.

Figure 5:
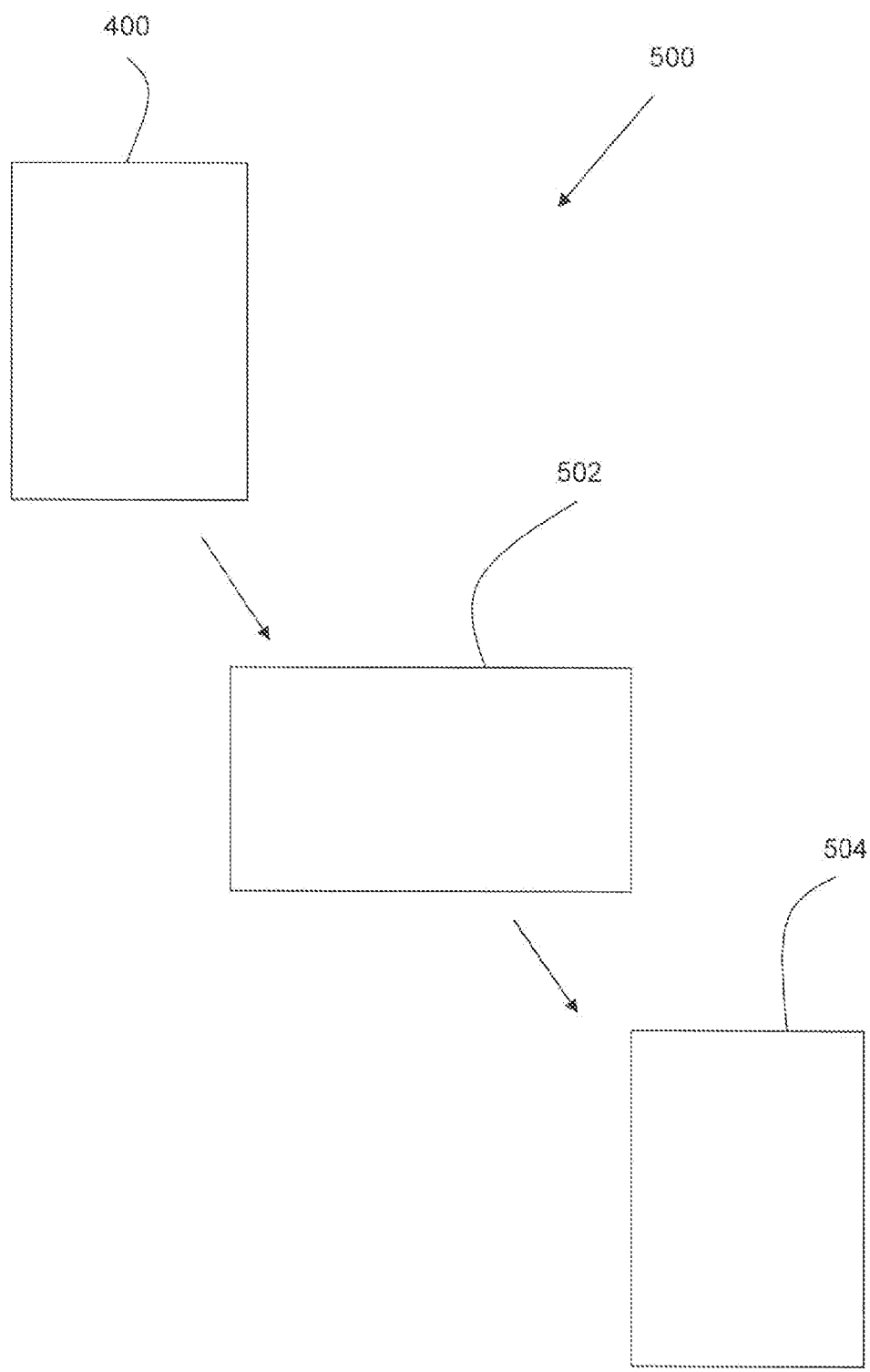
FIG. 5 is a schematic illustration of an audio/visual recording and playback system, according to an embodiment.

Referring to FIG. 5 of the accompanying drawings, there is shown an A/V recording and playback system 500 comprising an A/V recording apparatus 400, for example, illustrated and described with respect to FIG. 4, a content server 502, and an A/V playback apparatus 504.

Referring again to the process illustrated at FIG. 2, store 30 may include a special-purpose computer that includes at least a processor and memory for generating a three or two-dimensional map of the store 300, and links products to locations within the store map in a known manner.

At block 202, an in-store employee creates an A/V recording concerning a product in the store 300 on the A/V recording apparatus 400. Typically this can be done using a mobile phone or tablet with an A/V recording facility and the capability to upload the video to a content server or related storage device. However, with growing cross-fertilisation of features between devices this could be carried out, for instance, using a Wi-Fi enabled camera. Typically the A/V recording might contain material in which the employee introduces themselves, describes a product and gives their review of or opinion on the product. For example, in a food area of the store 300, an employee in an A/V recording might discuss what wine might go well with the current product or what alternative products of a similar type are available. A product can be tagged with the A/V recording at the same time or later, for instance by the employee scanning the barcode or the relevant product.

At block 204, the A/V recording apparatus 400 receives the modulated light from the LED emitters 310 which enables the location of the A/V recording apparatus 400 within the store 300 to be determined with accuracy. Each modulated LED emitter 310 in the store 300 has its output modulated in a unique way but at a frequency that means that it is not noticed by the human eye. A camera of a recording apparatus, typically on a smart phone or tablet, can pick up the modulations and use them to pinpoint the current location of the apparatus within the recorded store map. In one embodiment this may include a number associated with the modulated LED identified as the current location. This forms the location information.

At block 206 the A/V recording is tagged with the location information. Typically this means that the location information forms part of the metadata of the A/V recording file.

At block 208 the tagged A/V recording is uploaded to the content server 502.

Moving on to the next stage of the process, after signals or data related to the signals of the recording have been stored as content on the content server 502, at step 210 when a customer enters a store their smart device, such as a smart phone or tablet, acting as a playback apparatus 504 receives the modulated LED light signals from the emitters 310.

At step 212 the modulated LED data is transmitted to the content server 502. At step 214, the content server 502 looks up whether there is A/V recorded content associated with the location data received. At step 216 if there is A/V content associated with the location, the content server 502 returns the available video or videos to the customer's playback apparatus 504. At step 218 the available video or videos can either be offered to a customer for selection and playback or it/they can be automatically played on the customer's playback apparatus 504 according to the setting chosen by the customer. This can be enabled by an app on the customer's playback apparatus 504, Following a viewing of the available video or videos, the customer may be provided with further options such as information on related products, the location of products within the store 300 or the opportunity to purchase the product that has been the subject of the video online as an alternative to an in-store purchase.

Accordingly, using geo-location information, a customer can be provided with location-relevant A/V content.

As additional management controls, typically a store manager must approve a video before it can be downloaded to a customer's A/V playback apparatus.

Additionally, the content server 502 can store information about a given consumer's shopping history and can then notify the customer when a video associated with an item on their list is available in the relevant part of the store.

Alternatively, if a consumer has entered a shopping list on A/V playback apparatus 504, only video content related to items on the shopping list can be displayed for the consumer. Alternatively, if an item on a customer's shopping list is not available, a video or related form of media containing information on a related or alternative product can be determined as viewable by the consumer.

Thus, the video content possible to be displayed can be pre-determined based on a consumer's personal information.

Management information can be maintained in relation to the A/V recordings such as the number of times a video has been viewed, the rate at which products associated with viewed videos are purchased after a viewing, the number of videos recorded by each employee, etc.

Although a few embodiments have been shown and described, it will be appreciated by those skilled in the art that various changes and modifications might be made without departing from the scope of the invention, as defined in the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality.

In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination.

In particular, the features of any one example embodiment may be combined with features of any other embodiment, as appropriate, except where such combinations are mutually exclusive.

What is claimed is:

1. An audio/visual (A/V) recording and playback system, comprising:
an A/V recording apparatus, comprising:
an A/V input;
a memory configured for storing location-relevant video recording data related to A/V signals received from the A/V input;
a first locator in a store configured to determine a location of the A/V recording apparatus in response to an A/V recording operation in which the location-relevant video recording data is generated, and to provide location information of the A/V recording apparatus based on localized location inputs; and
a tagger configured to tag the location-relevant video recording data stored in the memory with the location information of the A/V recording apparatus, the system further comprising:
a mobile A/V playback apparatus comprising a display configured to display A/V content;
a second locator in the store configured to determine a location of the mobile A/V playback apparatus based on localized location inputs; and
a communicator configured to communicate with a content provider to display A/V content when the second locator determines that the mobile A/V playback apparatus is at the location where the A/V recording apparatus recorded the location-relevant video recording data, wherein the playback apparatus is configured to display the location-relevant video recording data produced by the A/V recording apparatus based on the tagged location information of the A/V recording apparatus and further based on personal information about a user of the playback apparatus, wherein the playback apparatus includes a user-selectable setting that when activated permits the playback apparatus to automatically display the location-relevant video recording data based on the tagged location information and the personal information.

2. The A/V recording and playback system of claim 1, further comprising an emitter that outputs the localized location inputs permitting a location of the A/V recording apparatus to be determined, wherein the emitter is at least one of: Li-Fi, short range radio waves, Wi-Fi beacons, RF ID tags and modulated visible light.

3. The A/V recording and playback system of claim 2, wherein the emitter has a range of up to 10 meters.

4. The A/V recording and playback system of claim 2, wherein the emitters have a range of up to 5 meters.

5. The A/V recording and playback system of claim 2, wherein the playback apparatus is configured to receive a modulated LED emission from the emitter to determine its location.

6. The A/V recording and playback system of claim 5, wherein the playback apparatus to automatically display the location-relevant video recording data based on the tagged location information and the personal information in response to a receipt of the modulated LED emission from the emitter.

7. The A/V recording and playback system of claim 1, wherein the playback apparatus is configured whereby prior to the playback of A/V content, a user is given the option of one or more A/V contents to display.

8. The A/V recording and playback system of claim 1, wherein the item location is displayed on a 3-dimensional (3-D) map of a store in which the item is located.

9. The A/V recording and playback system of claim 1, wherein the personal information includes a shopping list stored at the A/V playback apparatus, and wherein the A/V playback apparatus displays the video recording data produced by the A/V recording device in response to a determination by the system that the video recording data corresponds to at least one item on the shopping list.

10. A method of recording audio/visual (A/V) content, the method comprising:

recording signals related to an A/V input on a recording apparatus and storing on a memory the recorded signals as A/V content;

receiving location information of the recording apparatus from localized location inputs;

tagging the stored A/V content with the location information of the recording apparatus;

determining a location of a mobile A/V playback apparatus based on the localized location inputs;

displaying the stored location-relevant A/V content produced by the recording apparatus in response to a determination that the A/V playback apparatus is at a predetermined location based on the tagged location information of the A/V recording apparatus and further based on personal information about a user of the A/V playback apparatus, wherein the playback apparatus includes a user-selectable setting that when activated permits the playback apparatus to automatically display the location-relevant A/V content based on the tagged location information and the personal information, wherein the predetermined location includes the location at which or in the vicinity of where the A/V content was recorded based on the information tagged to the A/V recording; and displaying the location of an item for purchase in a store based on the tagged location information.

11. The method of claim 10, wherein providing location information includes executing an emitter, including at least one of: Li-Fi, short range radio waves, Wi-Fi beacons, RFID tags and modulated visible light.

12. The method of claim 11, wherein the emitter has a range of up to 10 meters.

13. The method of claim 11, wherein the emitter has a range of up to 5 meters.

14. The method of claim 10, wherein prior to the playback of A/V content, a user is given the option of one or more A/V contents to display.

15. The method of claim 10 further comprising displaying the location of an item for purchase based on the displayed A/V content.

16. The method of claim 15, wherein the item location is displayed on a 3-dimensional (3-D) map of a store in which the item is located.

* * * * *